United States Patent [19]
Miller

[11] 3,882,198
[45] May 6, 1975

[54] POLYVINYL HALIDE RESIN COMPOSITIONS HAVING IMPROVED PROCESSABILITY CONTAINING A METHYL METHACRYLATE/ALKYLACRYLATE COPOLYMER

[75] Inventor: Robert S. Miller, Bridgewater, N.J.

[73] Assignee: Tenneco Chemicals, Inc., Saddle Brook, N.J.

[22] Filed: May 20, 1974

[21] Appl. No.: 471,469

Related U.S. Application Data

[63] Continuation-in-part of Ser. No. 271,451, July 13, 1972.

[52] U.S. Cl. ........ 260/899; 260/86.1 E; 260/876 R; 260/891; 260/897 C
[51] Int. Cl. ............................................. C08f 29/24
[58] Field of Search ....................... 260/899, 86.1 E

[56] References Cited
UNITED STATES PATENTS

| | | | |
|---|---|---|---|
| 3,373,229 | 3/1968 | Philpot et al. | 260/899 |
| 3,814,740 | 6/1974 | Miller | 260/86.1 E |

*Primary Examiner*—Murray Tillman
*Assistant Examiner*—C. J. Seccuro
*Attorney, Agent, or Firm*—Evelyn Berlow

[57] ABSTRACT

The processability of polyvinyl halide resin compositions is improved by incorporating in the compositions up to about 20 percent, based on the weight of the polyvinyl halide resin, of a methyl methacrylate-alkyl acrylate copolymer that is a particulate solid resin having a maximum particle size not greater than 450 microns, a mean particle size of 20 to 70 microns, and a reduced specific viscosity of from 1.5 to 5.0 as measured in a 0.1 percent solution of the copolymer in chloroform at 20°C.

10 Claims, No Drawings

POLYVINYL HALIDE RESIN COMPOSITIONS HAVING IMPROVED PROCESSABILITY CONTAINING A METHYL METHACRYLATE/ALKYLACRYLATE COPOLYMER

This application is a continuation-in-part of my copending application Ser. No. 271,451, which was filed on July 13, 1972.

This invention relates to polyvinyl halide resin compositions having improved processability and to a process for their production.

Rigid polyvinyl halide resin compositions, which are compositions that are formulated to withstand temperatures of at least 350°F., are extremely inflexible and very difficult to work. Processing aids are commonly used to enable the resinous compositions to be processed satisfactorily at elevated temperatures. Under conditions of normal use at ambient temperatures, the resulting compositions retain the physical properties of the unmodified rigid polyvinyl halide resin compositions.

Among the copolymers that have been found to be most useful as processing aids for polyvinyl halide polymers are methyl methacrylate-alkyl acrylate copolymers. These copolymers have been reported to be easily dispersed in the polyvinyl halide and to form uniform mixtures therewith. See, for example, U.S. Pat. No. 3,373,229 (Philipot et al.). It is recognized by the art that the molecular weight of a methacrylate copolymer is an important factor in determining its ability as a prooccessing aid for polyvinyl halide polymers and that the molecular weight of these copolymers can be adjusted by varying the polymerization temperature, the catalyst concentration and the chain transfer agent concentration. Specifically, a decrease in temperature, a decrease in catalyst concentration, and a decrease in concentration of chain transfer agents all lead to increases in the molecular weight. Although these parameters have enabled the art to generally set the molecular weights of the methacrylate copolymers which have been utilized as polymer additives, the variations in the molecular weights of the commercial material have been relatively large. In the past, it has not been possible to carry out the preparation of methacrylate copolymers in an emulsion polymerization process using a free radical catalyst in such a way as to form products whose molecular weights and particle size can be accurately and reproducibly controlled within narrow ranges or to control the rate of the polymerization reaction to prevent the formation of a dangerously-overheated reaction product.

In accordance with this invention, it has been found that polyvinyl halide resin compositions that have excellent processing characteristics result when up to about 20 percent, based on the weight of the polyvinyl halide resin, of certain methyl methacrylate-alkyl acrylate copolymers is incorporated in the compositions. The methyl methacrylate-ethyl acrylate copolymers that are used as processing aids in the polyvinyl halide resin compositions of this invention are prepared by a process that allows their molecular weight, particle size, and particle size distribution to be controlled within narrow limits, thus overcoming the deficiencies of the previously-available methacrylate copolymers as processing aids. These copolymers have a maximum particle size of 450 microns; their mean particle size is in the range of 20 to 70 microns, preferably 25 to 55 microns, and optimally below 45 microns. The reduced specific viscosities of the methacrylate copolymers, which is a measure of their molecular weights, are between 1.5 and 5.0, and preferably between 2.0 and 3.0, as measured in a 0.1 percent solution in chloroform at 20°C.

The polyvinyl halide resin compositions that contain these methacrylate copolymer processing aids have better melt-flow characteristics during processing than do those that contain the previously-known methacrylate copolymers, and they can therefore be formed into smoother, more transparent products by extrusion, injection molding, compression molding, blow molding, and calendering. In addition, during molding and calendering the novel compositions are superior in sheet smoothness, hot tear strength, mill stick time, rolling bank effect, and other properties to compositions containing other processing aids. They also show a shorter fusion time with lower torque. The use of the novel processing aids in non-rigid, i.e., plasticized polyvinyl halide resin compositions results in products having decreased plate-out and improved heat stability. Plastisols containing these processing aids have improved viscosity stability and gelation characteristics as compared to those that contain other methacrylate copolymers.

The methacrylate copolymers that are used as processing aids in the compositions of this invention are methyl methacrylate-alkyl acrylate copolymers that are prepared by polymerizing a monomer mixture containing 80 to 99 mole percent of methyl methacrylate and 1 to 20 mole percent of an alkyl acrylate in which the alkyl group has from 1 to 10 carbon atoms, and preferably is ethyl acrylate, in an aqueous emulsion that contains (i) a water-soluble, free radical catalyst selected from the group consisting of hydrogen peroxide, ammonium persulfate, and alkali metal persulfates, (ii) an emulsifying agent, for example, a sodium alkylbenzene sulfonate, an ethoxylated alkylphenol, a sodium alkyl sulfate, or a salt of a long chain carboxylic acid or a sulfonic acid, and (iii) a chain-transfer agent that is an alkyl mercaptan having 4 to 14 carbon atoms at a temperature in the range of 50° to 70°C. until about 40 to 60 mole percent of the monomer mixture has polymerized, raising the temperature of the aqueous emulsion by at least 10°C. to a temperature in the range of 70° to 100°C. over a period of about 10 to 40 minutes, maintaining the aqueous emulsion at 70° to 100°c. until the polymerization is substantially complete, thereby forming a latex emulsion of the copolymer, and drying the latex emulsion to obtain a particulate product consisting of uniform, substantially spherical particles having a maximum particle size of 450 microns, a mean particle size of 20 to 70 microns, and a reduced specific viscosity of 1.5 to 5.0 as measured in an 0.1 percent solution in chloroform at 20°C.

The process by which the methyl methacrylate-alkyl acrylate copolymers are prepared is described in detail in my copending application Ser. No. 271,451, which was filed on July 13, 1972, and is incorporated herein by reference.

The amount of the methacrylate copolymer that is required to improve the processability of polyvinyl halide resin compositions is from 1 percent to 20 percent, based on the weight of the polyvinyl halide resin. When the molding and extrusion grades of resin are used, it is preferred that from 5 percent to 10 percent, based on the weight of the polyvinyl halide resin, of the methacrylate copolymer be incorporated into the composition.

The polyvinyl halide resins in which the methacrylate copolymers are useful as processing aids are the resinous products obtained by the polymerization of a vinyl halide in the presence or absence of a copolymerizable monomer. The term "polyvinyl halide resin" as used herein includes vinyl halide homopolymers, such as polyvinyl chloride and polyvinyl bromide, as well as vinyl halide copolymers including those formed by the polymerization of a vinyl halide with a comonomer such as vinyl acetate, vinyl propionate, vinyl butyrate, vinylidene chloride, styrene, methyl methacrylate, dialkyl fumarate or maleate, and the like. The vinyl halide is ordinarily and preferably the chloride, but the bromide and fluoride may also be used. The copolymers useful in the practice of this invention are those that contain at least 70 percent vinyl halide units and up to 30 percent of the comonomer units. The invention is also applicable to mixtures of polyvinyl halide resins in a major proportion with a minor proportion of another synthetic resin, such as chlorinated polyethylene, polyacrylate and polymethacrylate esters, and terpolymers of acrylonitrile, butadiene, and styrene.

The methacrylate copolymers may be incorporated in the polyvinyl halide resin by any suitable and convenient procedure. For example, the polyvinyl halide resin may be admixed with the methacrylate copolymer and other ingredients at room temperature and the resulting mixture milled on a two-roll mill at a temperature between 300° and 400°F. for a time sufficient to form a homogeneous sheet. The resulting composition may be removed from the mill in the form of a sheet or film of the desired thickness, which may be used as such or subjected to additional treatment.

In addition to the polyvinyl halide resin and the methacrylate copolymer, the compositions of this invention may contain heat and light stabilizers, such as barium, cadmium, zinc, and zirconium salts of organic acids and alkylphenols, organotin compounds, epoxidized oils, polyhydric alcohols, and organic phosphites; plasticizers, such as dioctyl phthalate, dibutyl sebacate, tricresyl phosphate, and octyl diphenyl phosphate; lubricants; pigments; dyes; extenders; solvents; and other resin additives in the amounts ordinarily employed for the purpose indicated.

The invention is further illustrated by the following example.

EXAMPLE

A. A methacrylate copolymer was prepared by charging the following ingredients to a jacketed reaction vessel equipped with a stirrer, gas inlet and outlet, and a thermometer:

| | Parts by Weight |
|---|---|
| Methyl methacrylate | 92.5 |
| Ethyl acrylate | 7.5 |
| Water | 184.0 |
| n-Dodecyl mercaptan | .065 |
| Sodium lauryl sulfate | 0.7 |
| Potassium persulfate, aqueous Solution (0.25% by weight) | 2.0 |

The water, methyl methacrylate, and ethyl acrylate were completely mixed with the mercaptan and sodium lauryl sulfate in the reaction vessel. The atmosphere above the reaction mixture was exhausted, and nitrogen gas was sparged into the autoclave. The reaction vessel was heated to 60°C. under continued agitation at which point the aqueous solution of catalyst which contained 0.005 part of potassium persulfate was added. The reaction mixture was maintained at 60°C. until 50 percent of the monomers had been converted. After approximately 140 minutes, the temperature in the reaction vessel was increased to 88°C. over a 30 minute period and maintained at that temperature until conversion of 98.6 percent was reached. The total time was approximately 3 to 4 hours. The copolymer had a reduced specific viscosity of 2.47 as measured in an 0.1 percent solution chloroform at 20°C.

The latex emulsion of the methacrylate copolymer was filtered through a 14-mesh screen. The resulting latex, which contained about 35 percent solids, was dried in a spray dryer, and the product was passed through a scalping sieve (40 mesh) to remove oversize particles.

The dried product consisted of substantially spherical particles having a maximum particle size of about 400 microns and a mean particle size of 30 microns.

B. A polyvinyl chloride resin composition was prepared by the following procedure:

A mixture of 100 parts by weight of polyvinyl chloride (Tenneco 10R), 10 parts by weight of the methacrylate copolymer of Example A, 1.4 parts by weight of glyceryl monoricinoleate, 0.5 part of stearyl stearate, and 2.0 parts by weight of dibutyltin bis(isooctyl maleate) was blended at room temperature and then charged to a two-roll, steam-heated mill whose roll surface was maintained at 340°F. The mixture was milled for 5 minutes and then removed from the mill as a homogeneous sheet that was 45 mils thick.

The methacrylate copolymer blended readily into the polyvinyl chloride on the mill, and the resulting resinous composition showed excellent rolling bank effect, sheet smoothness, hot tear strength and low mill stick time. Smooth, transparent parts were obtained when the composition was fabricated by calendering or by extrusion.

What is claimed is:

1. A resinous composition comprising a polyvinyl halide resin and from 1 to 20 parts by weight per 100 parts by weight of the polyvinyl halide resin of a methacrylate copolymer that is the product formed by the process that comprises the steps of
   a. forming an aqueous emulsion that contains
      i. a monomer mixture consisting of 80 to 99 mole percent of methyl methacrylate and 1 to 20 mole percent of at least one alkyl acrylate wherein the alkyl group has 1 to 10 carbon atoms,
      ii. a water-soluble, free-radical catalyst selected from the group consisting of hydrogen peroxide, ammonium persulfate, and alkali metal persulfates,
      iii. an emulsifying agent, and
      iv. An alkyl mercaptan having 4 to 14 carbon atoms;
   b. maintaining said aqueous emulsion at a temperature in the range of 50° to 70°C. until about 40 to 60 mole percent of the monomer mixture has polymerized;
   c. raising the temperature of the aqueous emulsion by at least 10°C. to a temperature in the range of 70° to 100°C. over a period of 10 to 40 minutes;

d. maintaining the aqueous emulsion at a temperature in the range of 70° to 100°C. until the polymerization of the monomer mixture is substantially complete and a latex emulsion is formed; and e. recovering the methyl methacrylate-alkyl acrylate copolymer from the latex emulsion.

2. The resinous composition of claim 1 that contains 5 parts to 10 parts by weight of said methacrylate copolymer per 100 parts by weight of the polyvinyl halide resin.

3. The resinous composition of claim 1 wherein the methacrylate copolymer is a methyl methacrylate-ethyl acrylate copolymer.

4. The resinous composition of claim 3 wherein the methacrylate copolymer contains 90 to 99 mole percent of methyl methacrylate and 1 to 10 mole percent of ethyl acrylate.

5. The resinous composition of claim 1 wherein the methacrylate copolymer consists of uniform substantially spherical particles having a maximum particle size of about 450 microns, a mean particle size of 20 to 70 microns, and a reduced specific viscosity of 1.5 to 5.0 as measured in a 0.1 percent solution of the copolymer in chloroform at 20°C.

6. The resinous composition of claim 1 wherein the polyvinyl halide resin is polyvinyl chloride.

7. The process for improving the processability of polyvinyl halide resins that comprises admixing a polyvinyl halide resin with from 1 percent to 20 percent, based on the weight of the polyvinyl halide resin, of a methacrylate copolymer that is the product formed by the process that comprises the steps of a. forming an aqueous emulsion that comprises i. a monomer mixture consisting of 80 to 99 mole percent of methyl methacrylate and 1 to 20 mole percent of at least one alkyl acrylate wherein the alkyl group has 1 to 10 carbon atoms, ii. a water-soluble, free-radical catalyst selected from the group consisting of hydrogen peroxide, ammonium persulfate, and alkali metal persulfates, iii. an emulsifying agent, and iv. an alkyl mercaptan having 4 to 14 carbon atoms;

b. maintaining said aqueous emulsion at a temperature in the range of 50° to 70°C. until about 40 to 60 mole percent of the monomer mixture has polymerized;

c. raising the temperature of the aqueous emulsion by at least 10°C. to a temperature in the range of 70° to 100°C. over a period of 10 to 40 minutes;

d. maintaining the aqueous emulsion at a temperature in the range of 70° to 100°C. until the polymerization of the monomer is substantially complete and a latex emulsion is formed; and e. recovering the methyl methacrylate-alkyl acrylate copolymer from the latex emulsion.

8. The process of claim 7 wherein from 5 percent to 10 percent, based on the weight of the polyvinyl halide resin, of said methacrylate copolymer is admixed with the polyvinyl halide resin.

9. The process of claim 7 wherein the methacrylate copolymer contains 90 to 99 mole percent of methyl methacrylate and 1 to 10 mole percent of ethyl acrylate.

10. The process of claim 7 wherein the polyvinyl halide resin is polyvinyl chloride.

* * * * *